United States Patent
George

(10) Patent No.: US 7,372,509 B2
(45) Date of Patent: May 13, 2008

(54) FOCUS VOLTAGE AMPLIFIER

(75) Inventor: John Barrett George, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 460 days.

(21) Appl. No.: 10/511,838

(22) PCT Filed: Apr. 21, 2003

(86) PCT No.: PCT/US03/12176

§ 371 (c)(1),
(2), (4) Date: Oct. 19, 2004

(87) PCT Pub. No.: WO03/090448

PCT Pub. Date: Oct. 30, 2003

(65) Prior Publication Data
US 2005/0231137 A1 Oct. 20, 2005

Related U.S. Application Data

(60) Provisional application No. 60/374,280, filed on Apr. 19, 2002.

(51) Int. Cl.
H04N 3/22 (2006.01)
H04N 3/26 (2006.01)
(52) U.S. Cl. .............. 348/806; 315/382; 315/382.1
(58) Field of Classification Search .......... 348/806, 348/805; 315/382, 403, 382.1, 408
See application file for complete search history.

(56) References Cited

U.S. PATENT DOCUMENTS 4,473,780 A * 9/1984 Gent ................... 315/382
5,227,701 A 7/1993 McIntyre
5,341,071 A 8/1994 George
5,486,741 A 1/1996 George
5,663,617 A 9/1997 Kobayashi
5,977,726 A 11/1999 Shishido
6,118,233 A * 9/2000 Craig et al. ............ 315/382
6,256,074 B1 7/2001 Wilber et al.
6,278,246 B1 8/2001 George
6,297,600 B1 10/2001 George
6,300,731 B1 * 10/2001 George ................. 315/382
6,504,326 B2 1/2003 Huckriede

OTHER PUBLICATIONS

Search Report Dated Oct. 20, 2003.

* cited by examiner

Primary Examiner—M. Lee
(74) Attorney, Agent, or Firm—Joseph J. Laks; Harvey D. Fried; Sammy S. Henig

(57) ABSTRACT

A dynamic focus amplifier for generating a dynamic focus voltage for a focus electrode for a cathode ray tube at a capacitive load includes a source of a periodic signal at a horizontal deflection frequency. A pull-down transistor is responsive to the periodic signal and coupled to the capacitive load for producing, in accordance with the periodic signal, a first portion of the dynamic focus voltage that decreases, during a first portion of a period of the periodic signal. A storage capacitor is coupled to the capacitive load for replenishing a charge stored in the storage capacitor from a charge stored in the capacitive load to develop a control voltage in the storage capacitor. A pull-up transistor is responsive to the control voltage and coupled to a source of a high voltage and to the capacitive load for producing from the high voltage a current that is coupled to the capacitive load. The current develops a second portion of the dynamic focus voltage that increases, during a second portion of the period of the periodic signal, and stores the charge in the capacitive load.

11 Claims, 3 Drawing Sheets

FOCUS VOLTAGE AMPLIFIER

This application claims the benefit, under 35 U.S.C. § 365 of International Application PCT/US03/12176, filed Apr. 21, 2003, which was published in accordance with PCT Article 21(2) on Oct. 30, 2003 in English and which claims the benefit of U.S. Provisional patent application Ser. No. 60/374,280, filed Apr. 19, 2002.

FIELD OF THE INVENTION

This invention relates to powering of kinescopes, and more particularly power reduction in relation to focus tracking in the presence of ultor voltage variation.

BACKGROUND OF THE INVENTION

Video displays, such as are used for television viewing and computer operation, often use kinescopes, picture tubes, or cathode ray tubes (CRTs) as the display device. A picture tube is a vacuum tube which has a phosphorescent display screen and control terminals for directing a focused electron beam toward the screen to generate the desired image. In general, a picture tube requires a relatively high anode or "ultor" voltage to accelerate the electron beam toward the screen, a cathode and a grid which coact for modulating the intensity of the electron beam in accordance with the image to be generated, and a focus electrode to which a focus voltage is applied to cause the electron beam to be focused at the screen. In addition, a picture tube is associated with a deflection arrangement for deflecting the electron beam both vertically and horizontally. The ultor or anode voltage of the picture tube is often regulated in order to reduce voltage changes attributable to interaction between the internal impedance of the ultor voltage source and the varying cathode or beam current required to generate an image. "Static" focus voltage is applied to the focus terminal of the picture tube in order to focus the electron beam at a given location, such as the center of the screen. It is well understood that the value of the "static" focus voltage is desirably a fixed proportion of the ultor voltage. Dynamic focus control is often provided for adjusting the value of the focus voltage applied to the picture tube in accordance with the position of the electron beam, in order to keep the electron beam focused on the screen notwithstanding the changing length of the electron beam path attributable to deflection.

In one prior art arrangement, the focus amplifier includes a pull-up transistor and a pull-down transistor. The pull-down transistor is responsive to an input signal at a frequency related to a deflection frequency for applying the amplified input signal to a capacitive load that includes the focus electrode capacitance. A high voltage source develops a high voltage at the collector of the pull-up transistor. The emitter of the pull-up transistor is coupled to the capacitive load. It may be desirable to generate the base voltage of the pull-up transistor in a manner that reduces power consumption from the high voltage source.

In carrying out an inventive feature, the base voltage of the pull-up transistor is generated in a storage capacitor from a charge stored in the capacitive load. A transfer of charge from the capacitive load to the storage capacitor does not add any significant power dissipation to a drive circuit that generates the base voltage of the pull-up transistor. Thereby, advantageously, power losses are reduced.

SUMMARY OF THE INVENTION

A dynamic focus amplifier for generating a focus voltage for a focus electrode of a cathode ray tube includes a high voltage source and a pull-up transistor responsive to a control voltage. The pull-up transistor is coupled to the high voltage source and to a capacitive load for generating a first dynamic focus voltage component of the focus voltage in the capacitive load. The amplifier further comprises a storage capacitor and a source of a periodic dynamic focus input signal at a frequency related to a deflection frequency. A pull-down transistor is coupled to the capacitive load to amplify the input signal for generating a second dynamic focus voltage component in the capacitive load. The capacitive load is coupled to the pull-up transistor for generating the control voltage of the pull-up transistor from a charge stored in the capacitive load.

DESCRIPTION OF THE INVENTION

Figure 1A:
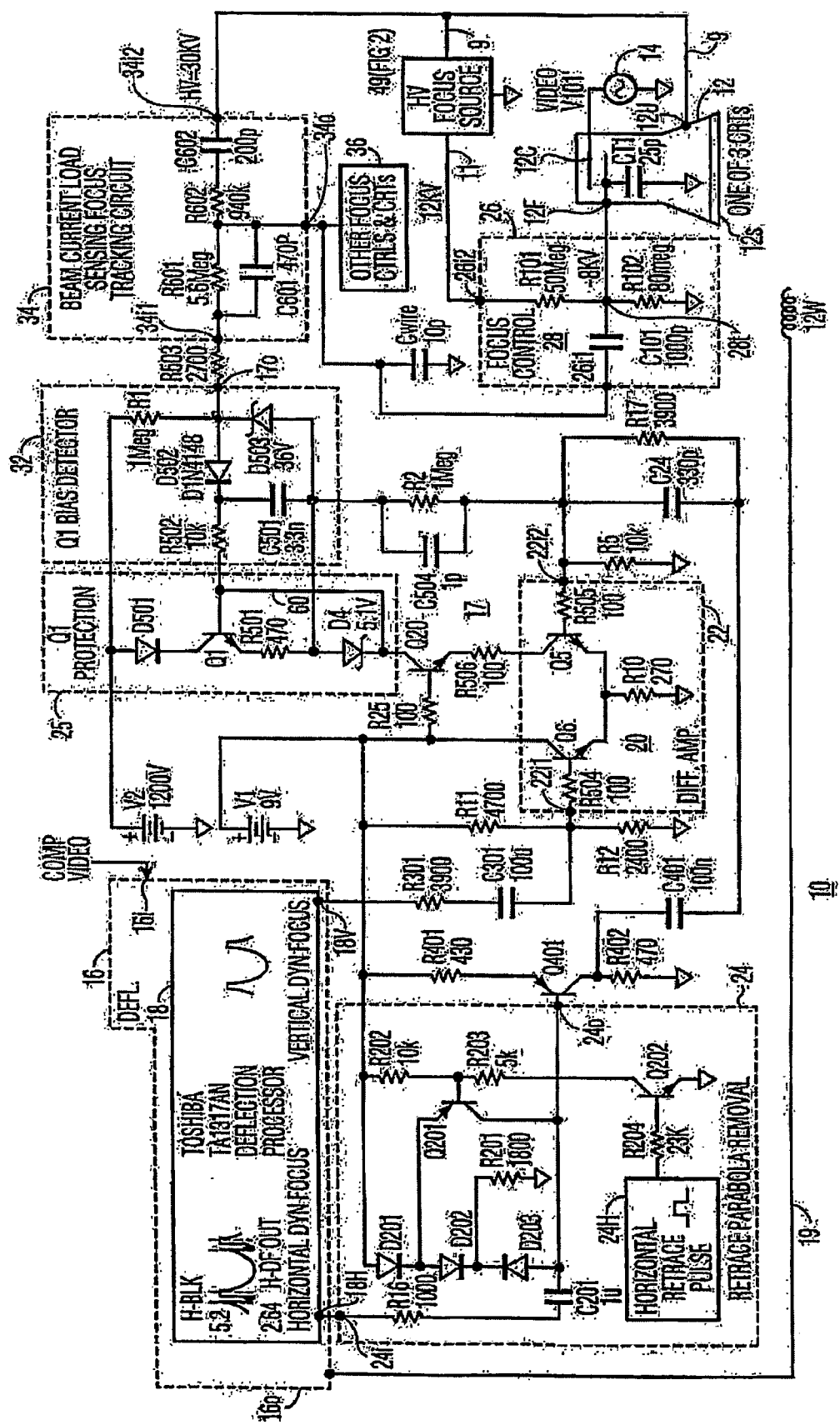
FIGS. 1a and 1b illustrate a dynamic focus amplifier, according to an aspect of the invention.

In FIG. 1a, a television apparatus designated generally as 10 includes at lower right a cathode-ray tube (CRT) or kinescope 12 which includes a screen 12s, an ultor or high voltage (anode) terminal 12U, a focus terminal 12F, and a cathode 12C. Cathode 12C of CRT 12 is illustrated as being connected to a source of image signal in the form of video source 14. As noted in FIG. 1a, CRT 12 may be one of three similar CRTs, as might be used, for example, in a projection television arrangement.

Figure 1B:
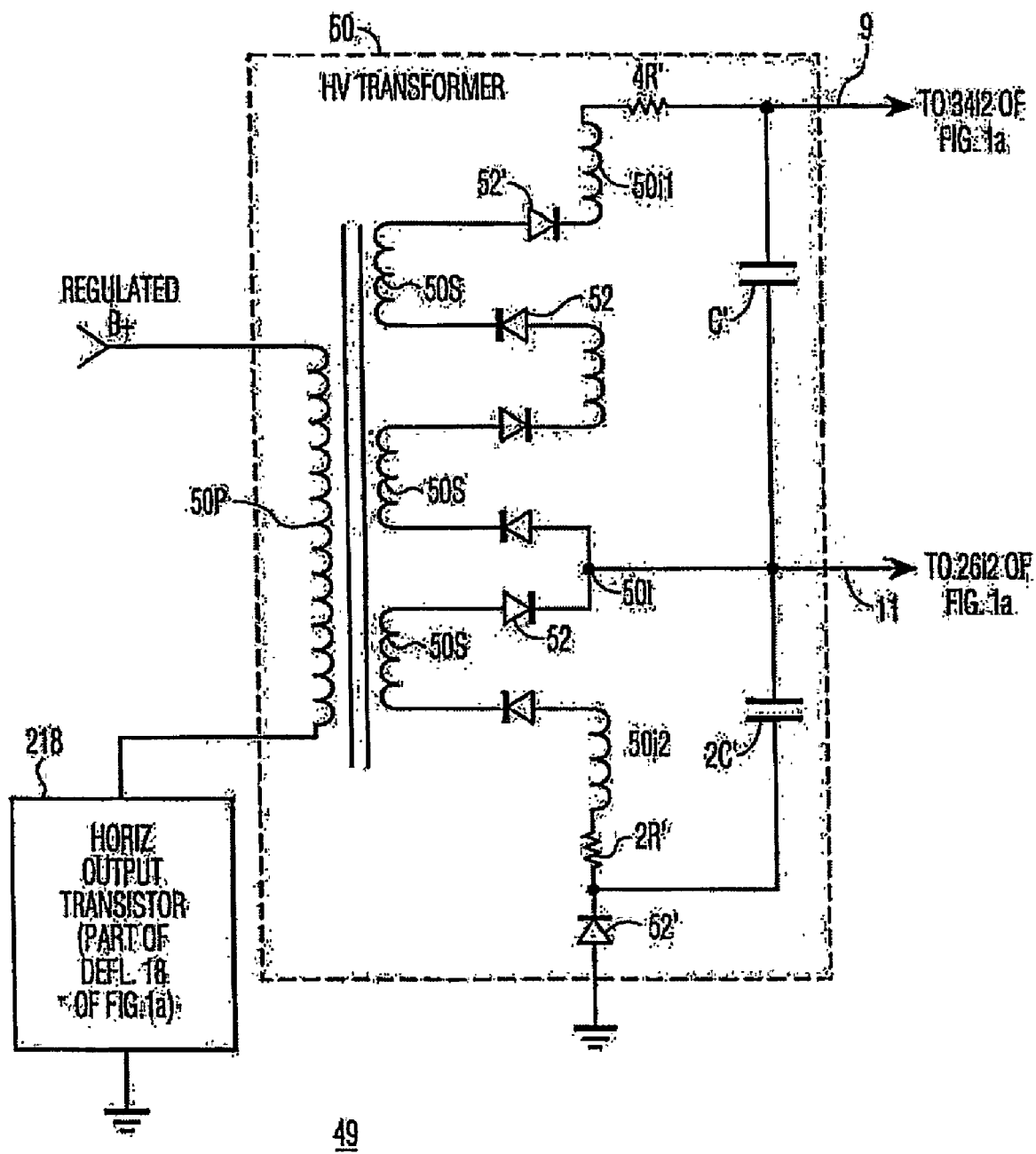

The ultor or high voltage terminal 12u of CRT 12 of FIG. 1a is connected by way of a conductor 9 to an ultor or high voltage and focus voltage source illustrated as a block 49. Block 49 is illustrated in more detail in FIG. 1b. In FIG. 1b, elements corresponding to those of FIG. 1a are designated by like reference numerals. Structure 49 of FIG. 1b includes an integrated high voltage/focus voltage transformer/rectifier arrangement designated generally as 50, which includes a primary winding 50p having one end connected to a source of regulated voltage B+ and another end connected to a horizontal output transistor illustrated as a block 218, which is a part of deflection block 18 at upper left of FIG. 1a. Transformer 50 of FIG. 1b also includes a distributed secondary winding made up of secondary sections designated 50s, with a rectifier or diode, some of which are designated 52, located between each pair of secondary sections. The uppermost secondary winding 50s in transformer 50 is connected by way of the serial combination of an inductor 50i and a further rectifier or diode 52' to high voltage conductor 9, from which the high voltage is coupled to ultor terminal 12u of FIG. 1a. The lowermost secondary winding 50s of transformer 50 of FIG. 1b is connected by way of the series combination of an inductor 50i2 and a diode 52" to ground. Resistor 4R' represents the distributed resistance of the secondary windings 52 lying above tap 50t, and a capacitor C' connected between transformer terminal 9 and tap 50t represents the distributed capacitance of the windings lying above tap 50t. Similarly, resistor 2R' represents the distributed resistance of windings 52 and inductor 50i2, lying below tap 50t of transformer 50, and capacitor 2C' represents the distributed capacitance. Tap 50t of transformer 50 of FIG. 1b is connected by way of a focus voltage conductor 11 to input terminal 26i2 of focus control 26 of FIG. 1a. Within focus control 26 of FIG. 1a, the focus voltage from transformer 50 is coupled to focus terminal 12F by means of a focus control 26 voltage divider designated as 28. Voltage divider 28 includes resistors R101 and R102, with a tap 28t therebetween. Tap 28t is connected to focus terminal 12F of CRT 12. Focus control 26 includes an input port 26i1 to which other focus signals may be applied.

Also in FIG. 1a, a deflection arrangement (Defl) illustrated at upper left as a block 16 receives composite video or at least separated synchronization signals at a port 16i. Deflection arrangement 16 produces vertical and horizontal deflection signals, illustrated together as being generated at an output terminal 16o and applied by way of a path 19 to deflection windings, illustrated together as 12 W, which is or are associated with the CRT 12, all as known in the art. Deflection arrangement 16 also includes a deflection processor 18, which for example is a Toshiba TA1317AN deflection processor. Deflection processor 18 produces horizontal dynamic focus signals at an output port 18H, and vertical dynamic focus signals at an output port 18V.

A dynamic focus combining circuit and amplifier, designated generally as 20 in FIG. 1a, includes a differential amplifier 22 including NPN transistors Q5 and Q6, together with a common emitter resistor R10 and base resistors R504 and R505. Vertical dynamic focus signals from terminal 18V of deflection processor 18 are applied by way of an AC-gain determining resistor R301 and a dc blocking capacitor C301 to a first input port 22i1 of differential amplifier 22. A voltage divider including resistors R11 and R12 provides bias and additional AC gain control for input terminal 22i1 of differential amplifier 22. Horizontal dynamic focus signals produced at terminal 18H of deflection processor 18, contain, or are associated with, a retrace parabola. The retrace parabola is removed from the horizontal dynamic focus signals in order to limit the bandwidth of the signals so that following slew-rate-limited circuits can respond usefully. The horizontal rate dynamic focus signals are applied from output terminal 18H of deflection processor 18 to an input port 24i of a retrace parabola removal circuit 24. The retrace parabola is removed from the horizontal dynamic focus signal by retrace parabola removal circuit 24, which includes transistors Q201 and Q202, diodes D201, D201, and D203, capacitor C201, and resistors R16, R201, R202, R203, and R204.

in FIG. 1a, retrace parabola removal circuit 24 includes the series combination of a resistor R16 and a coupling capacitor C201 electrically connected between input port 24i and output port 24o, so that in the absence of the remainder of the parabola removal circuit 24, the horizontal-rate dynamic focus signals are coupled from input port 24i to output port 24o without change. A source 24H of horizontal retrace pulses couples positive-going pulses by way of a resistor R204 to the base of a grounded-emitter NPN transistor Q202. Transistor Q202 is nonconductive during the horizontal trace interval, and conductive during the horizontal retrace interval. When transistor Q202 is nonconductive during the horizontal trace interval, PNP transistor Q201 receives no base bias, and is nonconductive. During horizontal retrace, when transistor Q202 is conductive, a voltage divider including resistors R202 and R203 applies a forward bias to the base-emitter junction of transistor Q201, as a result of which transistor Q201 turns ON. The emitter current of transistor Q201 flows through a diode D201 to the +V1 supply voltage, so the emitter of transistor Q201 is held at a voltage which is one semiconductor junction voltage drop (one VBE) below or more negative than the +V1 source voltage. Transistor Q201 also saturates or achieves a state of little collector-to-emitter voltage drop, so the collector of Q201, and therefore output port 24o, rises to within one VBE of the +V1 source. Thus, the output voltage of retrace parabola removal circuit 24 is set to a fixed voltage during horizontal retrace, regardless of the magnitude of the horizontal dynamic focus signal applied to input port 24i. A diode D202 and a resistor R201 together form a voltage divider that provides a reference voltage two (2) diode voltage drops (2VBE) below or more negative than the +V1 voltage source applied to the anode of D201. Thus, the cathodes of diodes D202 and D203 are 2VBE below +V1. Diode D203 together with capacitor C201 clamps the most positive portion of the horizontal dynamic focus waveform to the voltage at the emitter of transistor Q201. The voltage drops across diodes D202 and D203 cancel each other, and minimize changes in the clamped output signal due to temperature-dependent changes in the diode VBE. Similarly, diode 201 cancels the VBE drop in transistor Q401 such that the collector current from Q401 is zero during the most positive portion of the waveform at the base of transistor Q401. This clamps to ground the most negative portion of the waveform appearing in inverted form across resistor R402, including that portion or part eliminated during horizontal retrace by switching transistor Q201. The ground clamping action maintains a predictable direct voltage or DC if the horizontal dynamic focus waveform amplitude changes, as for example by bus control of Deflection Processor IC 18.

The horizontal dynamic focus signals with retrace parabola removed are generated at an output port 24o of retrace parabola removal circuit 24 of FIG. 1a, and are applied to the base of an inverting amplifier including PNP transistor Q401 and resistors R401 and R402. The amplified horizontal dynamic focus signals (with retrace parabola removed) are capacitively coupled from the collector of transistor Q401 by way of the series-parallel combination of an AC gain determining resistor R17 and capacitors C24 and C401 to the second input port 22i2 of differential amplifier 22. Differential amplifier 22 produces collector currents from both transistors which are related to the combination of the vertical and horizontal dynamic focus signals. The currents in the collector of transistor Q6 flow to direct voltage supply V1 without any effect. The current flow in the collector of Q5 represents the desired combined dynamic focus signals.

The "dynamic focus amplifier" designated generally as 17 in FIG. 1a includes differential amplifier 22, a Q1 Protection Circuit designated as a block 25, a Q1 Bias Detector circuit 32, feedback components R2 and C504, direct-current (DC) gain determining resistors R5, R11, and R12, vertical gain determining components R301, C301, R11, and R12, horizontal gain determining components C401, C24, and R17, and surge limiting resistors R503 and R25, all of which are discussed below. Terminal 17o is the output port of the dynamic focus amplifier 17.

A transistor Q20 of FIG. 1a is connected in a cascode arrangement with transistor Q5 of differential amplifier 22, with a low-value surge-protection resistor R506 therebetween. Transistor Q20 is a high-voltage transistor with low current gain and high voltage gain. The base of transistor Q20 is connected by a surge protection resistor R25 to direct voltage source V1, so the emitter of transistor Q20 can never rise above voltage V1. This arrangement also maintains constant voltage at the collector of transistor Q5, so there is no voltage change at the collector which can be coupled through the collector-to-base "Miller" capacitance to act as degenerative feedback at higher frequencies, so that transistor Q5 maintains a broad bandwidth.

Transistors Q1 and Q20 of FIG. 1a, and their ancillary components, together constitute a portion of high-voltage dynamic focus signal amplifier 17 for amplification of the combined dynamic focus signals. The load on the dynamic focus signal amplifier 17 is largely capacitive and equal to the parallel combination of capacitors C602, Cwire, and CT1 in the CRT(s) which is(are) driven with amplified dynamic focus signal. This parallel capacitance is charged through transistor Q1 and discharged through transistor Q20. In FIG. 1a, the collector of NPN transistor Q1 is connected by way of a diode D501 to receive supply voltage V2, and its emitter is connected by way of a resistor R501 and a zener diode D4 to the collector of transistor Q20. The base of transistor Q1 is connected by a conductor 60 to the collector of transistor Q20. The base of transistor Q1 is also connected by way of a resistor R502 to the junction of a capacitor C501 and the cathode of a diode D502. The other end of capacitor C501, and the anode of a zener diode D503, are connected to the junction of resistor R501 with the anode of zener diode D4. The anode of diode D502 and the cathode of zener diode D503 are connected to output terminal 17o of Q1 bias detector 32. Resistor R2 in parallel with capacitor C504 provide degenerative feedback from a location near the output terminal 17o to input port 22i2 of differential amplifier 22.

In operation of dynamic focus signal amplifier 17 of FIG. 1a, embodying an inventive feature, the collector current of transistor Q5 is coupled through The emitter-to-collector path of transistor Q20, diode D4, capacitor C501 and diode D502 to the output 17o of dynamic focus amplifier 17. As a result of the current flow to transistor Q20 from output terminal 17o, capacitor C501 charges.

In carrying out an aspect of the invention, output terminal 17o provides the charging current of capacitor C501 from the capacitive load formed by capacitors C602, Cwire and CT1 as set forth above. The charging continues until the zener or breakdown voltage of zener diode D503 is reached, after which time D503 conducts so as to hold the voltage across capacitor C501 constant and equal to the zener voltage. A small fraction of the collector current of Q20 flows through resistor R502. During conduction of collector current in transistor Q20, transistor Q1 is maintained OFF or nonconductive because the forward voltage drop across zener diode D4 reverse-biases the base-emitter junction of transistor Q1.

When collector current in transistor Q20 of FIG. 1a decreases to zero, during a portion of the operating cycle of dynamic focus signal amplifier 17, transistor Q1 is turned ON or rendered conductive by discharge of capacitor C501 through resistor R502, the base-emitter junction of transistor Q1, and resistor R501 back to capacitor C501. The base voltage of the transistor Q1 is generated in capacitor C501 from the voltage developed at output terminal 17o of the capacitive load formed by capacitors C602, Cwire and CT1. A transfer of charge from the capacitive load formed by capacitors C602, Cwire and CT1 to storage capacitor C501 does not add any significant power dissipation. Thereby, advantageously, power losses associated with the circuit that generates the base voltage of transistor Q1 are reduced.

With Q1 conductive, a substantial Q1 current tends to flow from supply V2 through diode D501, the collector-to-emitter path of transistor Q1, resistor R501, and forward-biased diode D503 to the amplifier output terminal 17o. Overcurrent damage to transistor Q1 is prevented by a feedback voltage developed across emitter resistor R501, which limits the collector current to a value established by the zener voltage of diode D4 (minus one base-emitter junction voltage) felt across the emitter resistor R501, so that Q1 operates at constant current when the zener voltage is reached. Capacitor C501 stores sufficient charge to keep Q1 ON during that entire portion of the amplifier cycle during which Q20 is OFF, and also to keep Q1 ON when the collector-to-emitter voltage of Q1 is low. This allows the maximum positive amplifier voltage to closely approach the voltage of supply V2. Resistor R1, connected between the positive V2 supply and output terminal 17o, precharges capacitor C501 at start-up so that the cyclic AC pumping operation can start. After start-up, the voltage developed across resistor R1 is relatively low, and the power dissipation in resistor R1 is, therefore, advantageously low. Diode D501 in conjunction with resistor R502 tend to protect transistor Q1 from overcurrent through its collector-to-base junction in the event of an internal arc in picture tube 12 between the high voltage or ultor terminal 12U and the focus terminal 12F.

Amplifier 17 of FIG. 1a may be considered to be a high voltage operational amplifier, at least from the point of view of its output terminal 17o. In this operational amplifier, resistor R2 and capacitor C504 provide feedback from output to input, and resistors R5, R11, and R12 set the direct (DC) operating point. Resistor R17 and capacitor C24 set the dynamic or AC gain for horizontal-rate dynamic focus signals, while resistors R301, R11, and R12 together with capacitor C301 set the dynamic or AC gain for vertical-rate dynamic focus signals.

The amplified combined vertical and horizontal dynamic bias signals produced at output port 17o of Q1 Bias Detector 32 of FIG. 1a may be viewed as being produced by a low-impedance source. The signals are applied from port 17o through a surge limiting resistor R503 to a first input port $34i_1$ of a beam current load sensing focus tracking circuit 34 ("combining" circuit 34). A second input port $34i_2$ is connected to the ultor terminal 12U of picture tube 12, for receiving the ultor voltage. An output port 34o of beam current load sensing focus tracking or combining circuit 34 is connected to input port 26i1 of focus control block 26, and possibly to other corresponding focus controls associated with other picture tubes than picture tube 12, all illustrated together as a block 36. A cost saving according to one aspect of the invention is achieved over regulated high voltage sources by allowing the high voltage to vary in response to beam current. Thus, high voltage source 49 is not regulated.

As illustrated in FIG. 1a, a resistor R601 is connected in parallel with a capacitor C601, and the parallel combination of R601 with C601 is connected at one end to input port $34i_1$ of combining circuit 34. The other end of the parallel combination of R601 with C601 is connected to output port 34o of combining circuit 34. Combining circuit 34 also contains the series combination of a resistor R602 with a capacitor C602, and one end of the series combination is connected to second input port $34i_2$, while the other end of the series combination is connected to output port 34o.

Beam current load sensing focus tracking circuit 34 of FIG. 1a may be viewed as a frequency-sensitive combiner, which combines the combined vertical and horizontal dynamic focus signals applied to its first input terminal $34i_1$ with components of the high voltage applied to its second input port $34i_2$. The resulting combined signals are applied to input port 26i1 of focus control block 26 for combination with a "static" component of the focus voltage.

The focus control 26 and the beam current load sensing focus tracking circuit 34 of FIG. 1a can be made by using the following values of components

| R101 | 50 | Megohms |
|---|---|---|
| R102 | 80 | Megohms |
| R601 | 5.6 | Megohms |
| R602 | 940 | Kilohms |
| C101 | 1000 | picofarads |
| C601 | 470 | picofarads |
| C602 | 200 | picofarads |

The stray wiring capacitance is designated as $C_{wire}$ and has a value of 10 picofarads, and the capacitance CT1 of the focus electrode of a single picture tube, such as picture tube 12, is about 25 picofarads. The output impedance of the Q1 Bias Detector 32 and the resistance of R503 are ignored as being too small relative to other values to affect the results. Those skilled in the art will recognize that the series capacitor C602 connected between second input port $34i_2$ and output terminal 34o of combining circuit 34 allows only variations or changes ("sag") in the high voltage to be coupled to output port 34o. Similarly, the presence of capacitor C101 connected between input port 26i1 of focus control block 26 and tap 28t of voltage divider 28 prevents the coupling of direct signal components to the tap 28t. Capacitor C101 together with the parallel combination of resistors R101 and R102 constitutes a high-pass filter having a cutoff or break frequency of about 5 Hertz (Hz).

Figure 2:
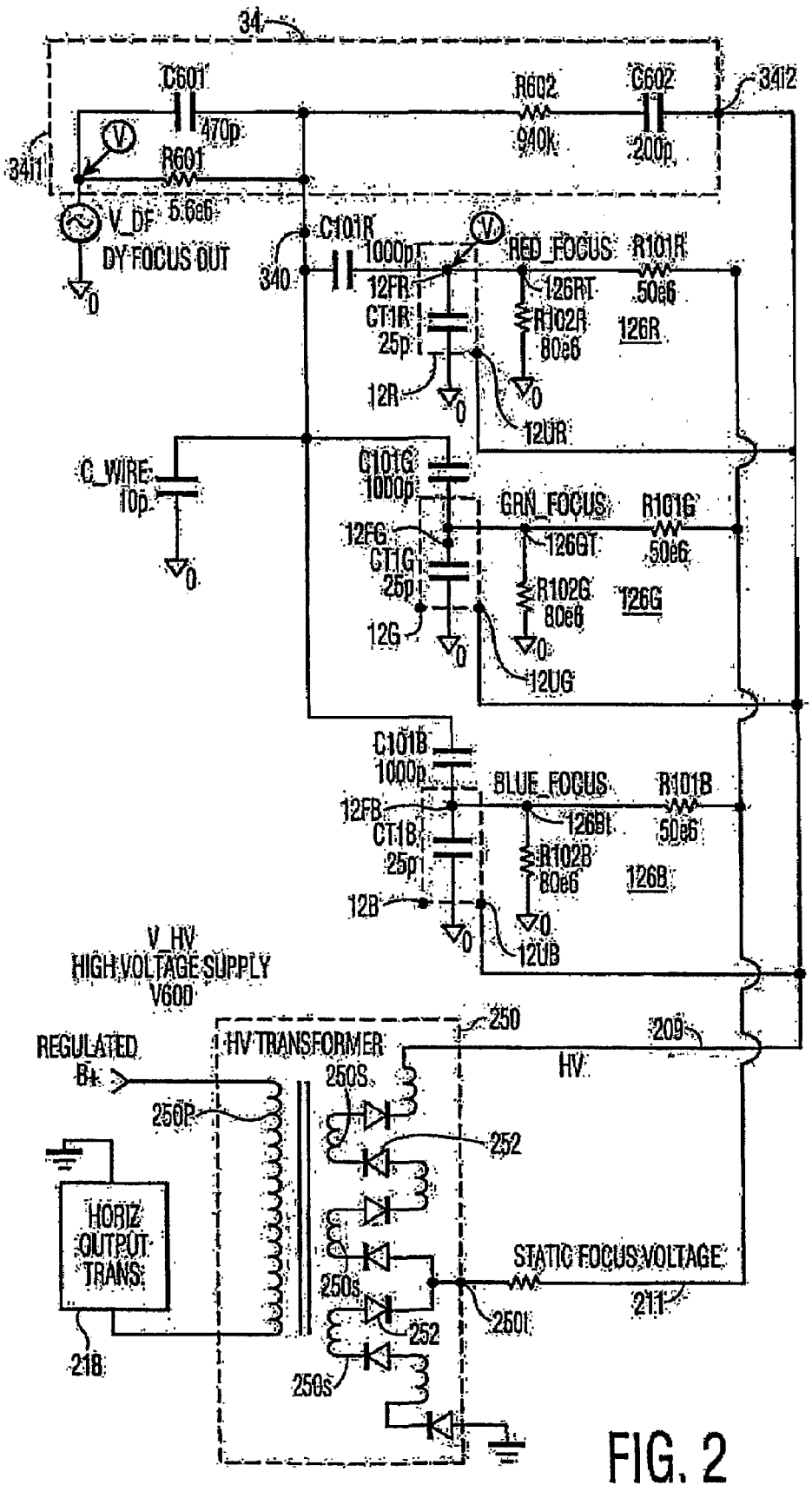
FIG. 2 is a simplified equivalent diagram of an arrangement in which three picture tubes are used.

FIG. 2 is a simplified equivalent circuit or schematic diagram of a television or video display apparatus according to an aspect of the invention in which red, green, and blue cathode-ray or picture tubes are used for the display. The red, green and blue picture tubes are illustrated as blocks 12R, 12G, and 12B, respectively, their ultor terminals are identified as 12UR, 12UG, and 12UB, respectively, and their focus terminals are identified as 12FR, 12FG, and 12FB, respectively. In FIG. 2, elements corresponding to those of FIG. 1a are designated by like reference numerals. Elements R101, R102, and C101 have appended letters R, G or B to identify corresponding elements associated with the red, green and blue cathode-ray tube displays, respectively. In FIG. 2, a source V_DF represents the combined vertical and horizontal dynamic focus signal source applied to first input port $34i_1$ of combiner 34.

Source V_HV of FIG. 2 represents the high or ultor supply voltage source. Voltage source V_HV includes an integrated transformer 250 with a primary winding 250p. Primary winding 250p is connected at one end to a source of regulated B+ and at the other end to a block representing a switching horizontal output transistor. Transformer 250 also includes a distributed secondary winding, including a plurality of windings, each of which is designated 250s. The distributed secondary winding of transformer 250 is grounded at one end. A set of diodes, some of which are designated as 252, is interspersed between the winding secondary sections 250s, and act to rectify the high voltage produced on an output conductor illustrated as 209. A "static" focus voltage is produced at a tap 250t of transformer 250. In one embodiment of the invention, tap 250t is a ⅓ tap relative to the ultor voltage, so that the static focus voltage produced at tap 250t is about ⅓ of the high voltage produced on conductor 209, and remains at a fixed percentage of the ultor voltage.

The high or ultor voltage V_HV is coupled by way of conductor 209 to terminal 34i2 of combining circuit 34, and to the ultor connections 12UR, 12UG, and 12UB of the red, green, and blue picture tubes 12R, 12G, and 12B, respectively, of FIG. 2, so that combiner 34 and all the cathode-ray tubes are fed in common from the ultor supply V_HV. The static focus voltage is coupled from tap 250t by way of a conductor illustrated as 211 to the red, blue and green focus terminals 12FR, 12FG, and 12FB, respectively, by resistive voltage dividers 126R, 126G, and 126B, respectively. Voltage divider 126R includes series resistor R101R and shunt resistor R102R having a tap 126Rt therebetween. Tap 126Rt is coupled to red picture tube focus terminal 12FR. Resistor R101R has a value of 50 Megohms and resistor R102R has a value of 80 Megohms. Similarly, voltage divider 126G includes series resistor R101G and shunt resistor R102G having a tap 126Gt therebetween. Tap 126Gt is coupled to green picture tube focus terminal 12FG. Resistor R101G has a value of 50 Megohms, and resistor R102G has a value of 80 Megohms. Also, voltage divider 126B includes series resistor R101B and shunt resistor R102B having a tap 126Bt therebetween. Tap 126Bt is coupled to blue picture tube focus terminal 12FB. Resistor R101B has a value of 50 Megohms and resistor R102B has a value of 80 Megohms. Thus, each focus terminal 12FR, 12FG, and 12FB of the red, green, and blue picture tubes "sees" its static focus voltage as being sourced from an impedance of about 30 Megohms, just as in the arrangement of FIG. 1a.

Output terminal 34o of combiner 34 of FIG. 2 is coupled to each of the red, green and blue focus terminals 12FR, 12FG, and 12FB, respectively, by a coupling capacitor C101R, C101G, and C101B, respectively. Each of capacitors C101R, C101G, and C101B has a value of 1000 pF. The capacitance of the red, green and blue picture tubes are designated as CT1R, CT1G, and CT1B, respectively.

What is claimed is:

1. A dynamic focus amplifier for generating a focus voltage for a focus electrode of a cathode ray tube, comprising:
    a source of a high voltage;
    a pull-up transistor responsive to a control voltage and coupled to said source of said high voltage and to a capacitive load for generating a first dynamic focus voltage portion of said focus voltage in said capacitive load;
    a source of a periodic dynamic focus input signal at a frequency related to a deflection frequency; and
    a pull-down transistor responsive to said input signal and coupled to said capacitive load to amplify said input signal for generating a second dynamic focus voltage portion of said focus voltage in said capacitive load, said capacitive load being coupled to said pull-up transistor for generating said control voltage of said pull-up transistor from a charge stored in said capacitive load.

2. The amplifier according to claim 1, further comprising a storage capacitor wherein said pull-down transistor is coupled to said storage capacitor for generating said control voltage in said storage capacitor from said charge stored in said capacitive load.

3. The amplifier according to claim 2, wherein said pull-down transistor couples said storage capacitor to said capacitive load for generating said control voltage in said storage capacitor, during a first portion of a period of said periodic dynamic focus input signal.

4. The amplifier according to claim 3, further comprising a semiconductor switch for preventing a transfer of a charge from said storage capacitor to said capacitive load, during a second portion of said period of said periodic dynamic focus input signal.

5. The amplifier according to claim 2, wherein said storage capacitor is coupled between a control terminal and a main current conducting terminal of said pull-up transistor.

6. The amplifier according to claim 2, wherein said storage capacitor is charged by a pull-down current flowing from said capacitive load through said pull-down transistor during a portion of a period of said input signal.

7. The amplifier according to claim 2, further comprising an impedance coupled to said source of said high voltage and to at least said storage capacitor for charging said storage capacitor, during a start-up operation.

8. The amplifier according to claim 2, further comprising a zener diode coupled to said storage capacitor for limiting said control voltage.

9. The amplifier according to claim 1, wherein said input signal includes a signal component at a frequency related to at least one of a horizontal deflection frequency and a vertical deflection frequency.

10. A dynamic focus amplifier for generating a focus voltage for a focus terminal of a cathode ray tube, comprising:
   a source of a high voltage;
   a pull-up transistor having a first main current conducting terminal coupled to said source of said high voltage and a second main current conducting terminal coupled to a capacitive load for developing a first portion of said focus voltage in said capacitive load from said high voltage;
   a storage capacitor;
   a source of a periodic dynamic focus input signal at a frequency related to a deflection frequency; and
   a pull-down transistor having an input, control terminal coupled to said periodic dynamic focus input signal source and a main current conducting terminal coupled to said capacitive load to amplify said input signal for generating a second portion of said focus voltage in said capacitive load, said main current conducting terminal of said pull-down transistor being coupled to said storage capacitor for generating a control voltage in said storage capacitor that is coupled to a control terminal of said pull-up transistor, said storage capacitor being charged from said capacitive load.

11. The amplifier according to claim 10, wherein said input signal includes a signal component at a frequency related to at least one of a horizontal deflection frequency and a vertical deflection frequency.

* * * * *